(12) United States Patent
Smirnov et al.

(10) Patent No.: US 7,521,831 B2
(45) Date of Patent: Apr. 21, 2009

(54) ULTRA-SLIM SPINDLE MOTOR

(75) Inventors: Viatcheslav Smirnov, Gyunggi-do (KR); Young Sun Yoo, Gyunggi-do (KR); Pyo Kim, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 18 days.

(21) Appl. No.: 11/730,698

(22) Filed: Apr. 3, 2007

(65) Prior Publication Data

US 2007/0228851 A1 Oct. 4, 2007

(30) Foreign Application Priority Data

Apr. 3, 2006 (KR) .................. 10-2006-0030159

(51) Int. Cl.
*H02K 7/00* (2006.01)
*H02K 5/16* (2006.01)

(52) U.S. Cl. .................. 310/90; 310/67 R; 310/91; 310/51; 310/156.01

(58) Field of Classification Search .............. 310/67 R, 310/156.01, 90, 51, 91
See application file for complete search history.

(56) References Cited

U.S. PATENT DOCUMENTS

| | | | | |
|---|---|---|---|---|
| 4,629,919 A | * | 12/1986 | Merkle | 310/90 |
| 4,788,464 A | * | 11/1988 | Nishikawa et al. | 310/268 |
| 5,747,908 A | * | 5/1998 | Saneshige et al. | 310/91 |
| 5,883,455 A | * | 3/1999 | Fukasawa et al. | 310/91 |
| 5,910,693 A | * | 6/1999 | Park | 310/67 R |
| 6,052,257 A | * | 4/2000 | Branger et al. | 360/99.08 |
| 6,252,319 B1 | * | 6/2001 | Sudo et al. | 310/67 R |
| 6,339,273 B1 | * | 1/2002 | Higuchi | 310/91 |
| 6,455,961 B1 | * | 9/2002 | Higuchi | 310/67 R |
| 6,525,441 B2 | * | 2/2003 | Yamaguchi | 310/90 |
| 6,661,131 B2 | * | 12/2003 | Fukutani | 310/51 |
| 6,897,586 B2 | * | 5/2005 | Horng et al. | 310/90 |
| 6,922,309 B2 | * | 7/2005 | Kayama et al. | 360/99.08 |
| 2003/0020341 A1 | * | 1/2003 | Nagatsuka | 310/67 R |

\* cited by examiner

*Primary Examiner*—Quyen P Leung
*Assistant Examiner*—John K Kim

(57) ABSTRACT

A spindle motor, which includes a bearing to rotatably support a rotating shaft, a bearing holder to securely hold the bearing therein, a base to securely support the bearing holder thereon, a thrust washer aligned at the upper end thereof with the upper end of the base in the same horizontal plane and supporting the rotating shaft in a thrusting direction, a thrust washer cover to receive the thrust washer, and a bearing holder support securely installed between the thrust washer cover and the base and supporting the bearing holder. The bearing holder support is secured to the bearing holder and covers both the lower end of the bearing and part of the lower end of the bearing holder. The bearing holder support includes a protrusion inserted into a depression formed on the lower end of the bearing holder and an edge caulked to the base.

7 Claims, 7 Drawing Sheets

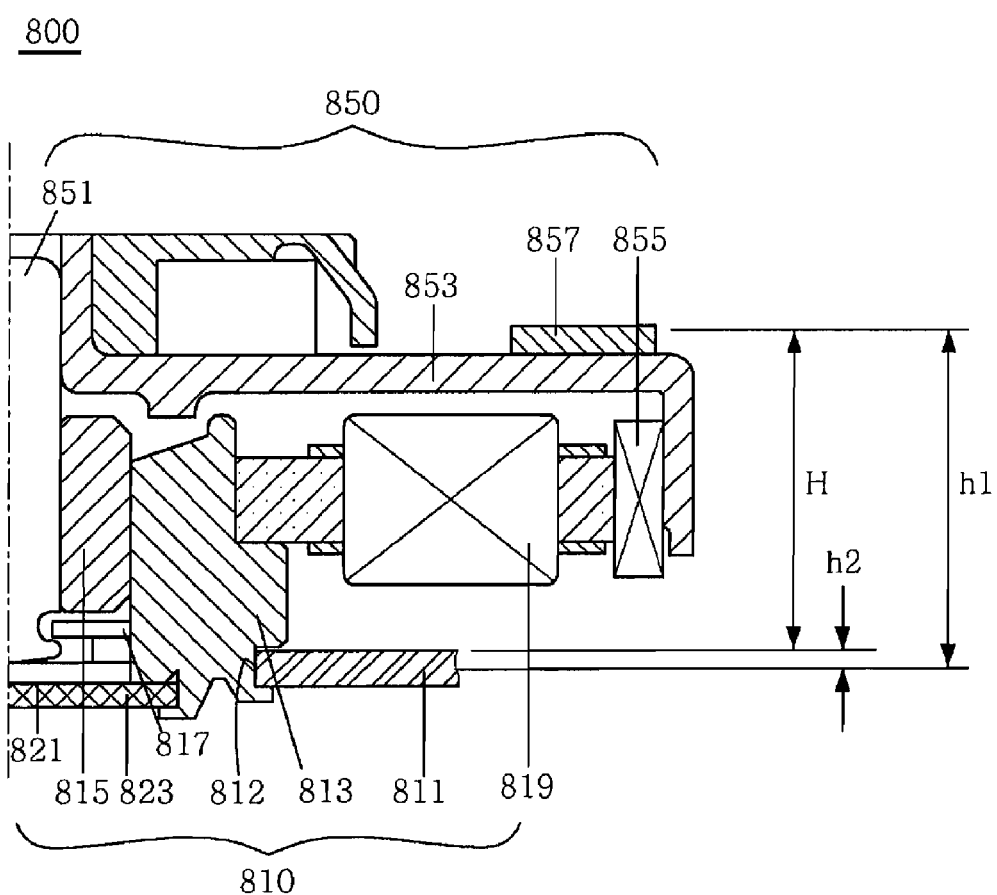
FIG.8 – PRIOR ART

FIG.9 - PRIOR ART
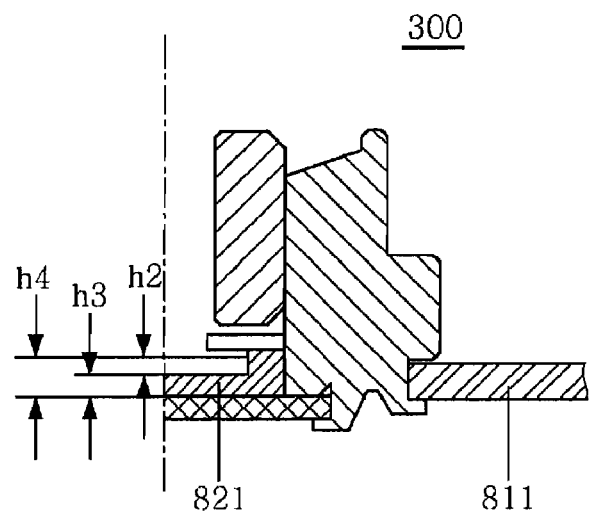
FIG.10 - PRIOR ART
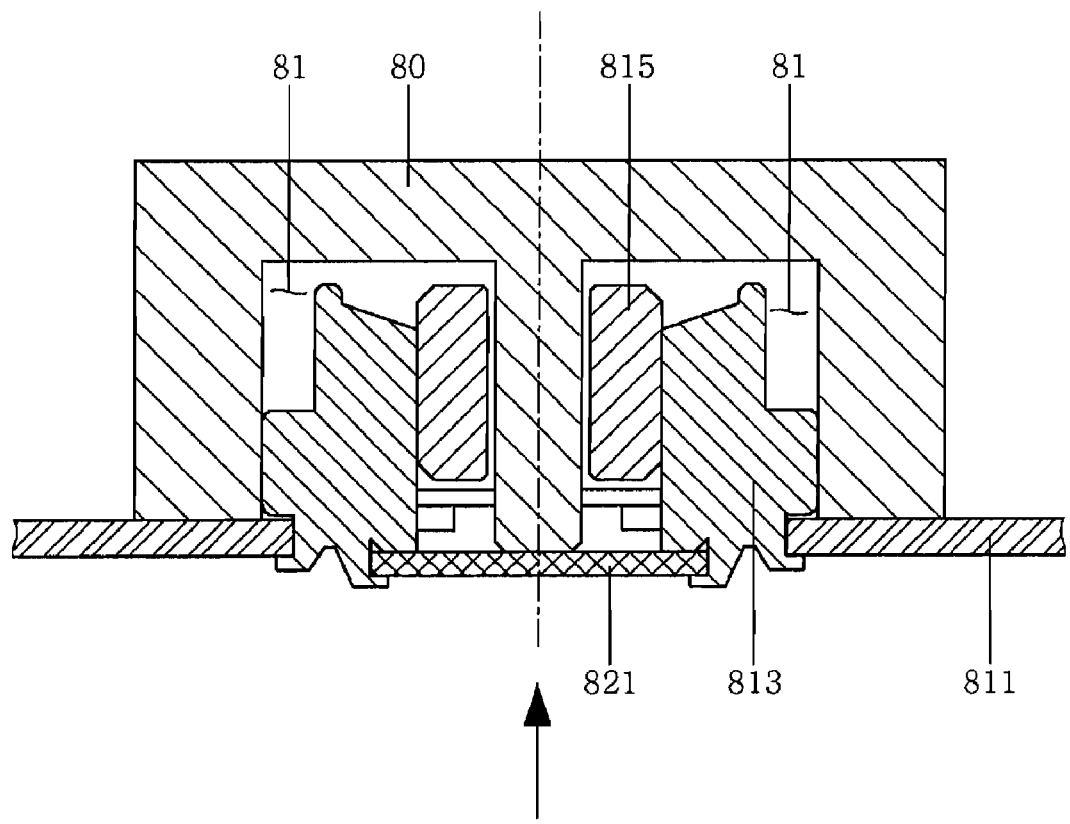

ULTRA-SLIM SPINDLE MOTOR

CROSS REFERENCE TO RELATED APPLICATION(S)

This application claims the benefit of Korean Patent Application No. 10-2006-0030159, filed on Apr. 3, 2006, entitled Ultra Slim Spindle Motor, which is hereby incorporated by reference in its entirety into this application.

BACKGROUND OF THE INVENTION

1. Field of the Invention

The present invention relates, in general, to spindle motors and, more particularly, to an ultra-slim spindle motor, which has a reduced thickness because the production tolerance and/or the assembly tolerance are reduced.

2. Description of the Related Art

Generally, spindle motors are provided therein with hydrodynamic bearings for producing hydrodynamic pressure, and are preferably used in drive devices, such as hard disc drives (HDD). In recent years, spindle motors have come to be used in highly portable products, such as MP3 players or mobile phones, and thus it is required to accomplish compactness, smallness, lightness and/or thinness of the spindle motors. An example of conventional spindle motors is shown in FIG. 8 and FIG. 9.

As shown in FIG. 8 and FIG. 9, the conventional spindle motor 800 comprises a fixed assembly 810 and a rotary assembly 850, which is rotatably supported on the fixed assembly 810.

The fixed assembly 810 comprises a base 811, a bearing holder 813, a bearing 815, a sealing cap 817, an armature 819, a thrust washer 821 and a thrust washer support plate 823.

The base 811 is securely mounted to a drive device (not shown), such as a hard disc drive (HDD) in which the spindle motor 800 is installed. A central opening 812 is formed through the center of the base 811.

The bearing holder 813 is inserted into the central opening 812 and is caulked to the base 811 at the lower end thereof. The bearing 815 is fitted into the bearing holder 813 such that the central axis thereof is aligned with the central axis of the rotating shaft 851, and the outer surface thereof is in close contact with the inner circumferential surface of the bearing holder 813.

The sealing cap 817 is inserted into the bearing holder 813 such that it is secured to the inner circumferential surface of the bearing holder 813 and closes almost all of the lower end of the bearing 815 at a location below the bearing 815. The armature 819 is securely installed on the outer circumferential surface of the bearing holder 813.

The thrust washer 821 is inserted into the bearing holder 813 and is secured to the inner circumferential surface of the bearing holder 813, such that the washer 821 is in contact with the lower end of the rotating shaft 851. The thrust washer support plate 823 is inserted into the bearing holder 813 and is secured to the inner circumferential surface of the bearing holder 813 such that the support plate 823 is in contact with the lower surface of the thrust washer 821. In the above state, the thrust washer support plate 823 is secured to the bearing holder 813 by caulking the bearing holder 813.

Here, as shown in FIG. 10, to mount the thrust washer 821, the base 811 is seated on an assembly jig 80 such that both the bearing 815 and the bearing holder 813 are inserted into a depression 81 of the assembly jig 80 and, thereafter, the thrust washer 821 is inserted into the bearing holder 813 by forcing the thrust washer 821 in the direction shown by the arrow in FIG. 10.

The rotary assembly 850 comprises a rotating shaft 851, a rotor cover 853, a magnet 855 and a rubber turntable 857.

The rotating shaft 851 is supported at the lower end thereof by the thrust washer 821 in a thrusting direction. The outer circumferential surface of the rotating shaft 851 is rotatably supported by the bearing 815 in a non-contact method. The rotor cover 853 is secured to the upper end of the rotating shaft 851.

The magnet 855 is secured to the inner circumferential surface of the rotor cover 853 such that the magnet 855 faces the armature 819. The rubber turntable 857 is secured along the outer edge of the upper surface of the rotor cover 853.

In the above-mentioned construction, the height of the spindle motor 800 is determined by the height H from the upper surface of the base 811 to the upper surface of the rubber turntable 857. Thus, the height of the spindle motor 800 can be reduced by reducing the height H from the upper surface of the base 811 to the upper end of the rubber turntable 857. The height H is determined by the difference between the height $h1$ from the upper surface of the thrust washer 821 to the upper surface of the rubber turntable 857 and by the height $h2$ from the upper surface of the base 811 to the upper surface of the thrust washer 821. That is, $H=h1-h2$. Further, as shown in FIG. 10, the height $h2$ from the upper surface of the thrust washer 821 to the upper surface of the base 811 is determined by the difference between the thickness $h4$ of the base 811 and the thickness $h3$ of the thrust washer 821, that is, $h2=h4-h3$.

Here, the thicknesses $h4$ and $h3$ are determined in consideration of tolerance during a process of producing the base 811 and the thrust washer 821. The tolerance, which is considered during the determination of $h4$ and $h3$, is the production tolerance of $h2$. Further, the thickness $h1$ is determined in consideration of tolerance during a process of producing the rubber turntable 857. The tolerance, which is considered during the determination of $h1$, is the tolerance of the height H of the spindle motor during the process of assembling the elements into the spindle motor 800. Thus, when the elements are completely assembled into the spindle motor 800, a large accumulated tolerance may result, reducing the reliability of the size of the product and making it difficult to realize a compact product.

Further, the contact ends of the assembly jig 80, which is used for pressure-fitting the thrust washer 821, have different heights, in other words, the central contact end 82 and the outside contact end 83 of the assembly jig 821 have different heights, so that the contact ends 82 and 83 require separate cutting operations, such as planing or grinding operations. Thus, it is difficult to produce the assembly jig 80.

SUMMARY OF THE INVENTION

Accordingly, the present invention has been made keeping in mind the above problems occurring in the related art, and an object of the present invention is to provide an ultra-slim spindle motor, in which the upper surface of a base and the upper surface of a thrust washer are arranged in the same horizontal plane, thus reducing the accumulated tolerance, that is, the sum total of the production tolerance and the assembly tolerance of both the thrust washer and the base, thereby reducing the size of the spindle motor and allowing easy production of an assembly jig.

In order to achieve the above object, according to one aspect of the present invention, there is provided a spindle motor, comprising: a support unit for supporting a rotating shaft in a thrusting direction; and a base unit placed such that an upper end thereof is aligned with an upper end of the support unit in the same horizontal plane.

In the spindle motor, the support unit may be provided with a contact part that comes into contact with the rotating shaft, the contact part being aligned with the upper end of the base unit in the same horizontal plane.

In an embodiment, there is provided a spindle motor, comprising: a bearing for rotatably supporting a rotating shaft; a bearing holder for securely holding the bearing therein; a base for securely supporting the bearing holder thereon; a thrust washer aligned at an upper end thereof with an upper end of the base in the same horizontal plane and supporting the rotating shaft in a thrusting direction; a thrust washer cover for receiving the thrust washer therein so as to cover the thrust washer; and a bearing holder support securely installed between the thrust washer cover and the base and supporting the bearing holder.

In the spindle motor, the bearing and the bearing holder may be placed such that ends thereof are arranged in the same horizontal plane, and the bearing holder support may be secured to the bearing holder such that the bearing holder support covers both a lower end of the bearing and part of a lower end of the bearing holder.

In the spindle motor, the bearing holder support may be provided with a protrusion that is inserted into a depression formed in the lower end of the bearing holder. Further, the bearing holder support may be provided with an edge that is caulked to the base.

In another embodiment, the ends of the bearing and the bearing holder are arranged in the same horizontal plane, and the thrust washer cover radially extends so as to cover both a lower end of the bearing and part of a lower end of the bearing holder, and is secured to the bearing holder.

In the spindle motor, the thrust washer cover may be provided with an outside edge to be inserted into a depression formed in the lower end of the bearing holder. Further, the bearing holder support may be provided with both a protrusion to be inserted into the depression of the bearing holder and an edge caulked to the base.

In a further embodiment, the bearing holder is provided with an end extending to the thrust washer cover, an inner circumferential surface that comes into close contact with the thrust washer cover, and an outer circumferential surface that comes into close contact with the bearing holder support.

In the spindle motor, the bearing holder support may be provided both with a protrusion to be inserted into a depression formed in a lower end of the bearing holder and with an edge that is caulked to the base.

In another aspect, the present invention provides a spindle motor, comprising: a bearing for rotatably supporting a rotating shaft; a bearing holder for securely holding the bearing therein; a base for securely supporting the bearing holder thereon; a thrust washer aligned at an upper end thereof with an upper end of the base in the same horizontal plane and supporting the rotating shaft in a thrusting direction; a thrust washer cover closely engaged with the bearing holder and receiving the thrust washer therein so as to cover the thrust washer.

In an embodiment, the thrust washer cover radially extends so as to cover both a lower end of the bearing and part of a lower end of the bearing holder, and is secured to the bearing holder.

In the spindle motor, the thrust washer cover may be provided with an outside edge to be inserted into a depression formed in the lower end of the bearing holder. Further, the bearing holder may be provided with an edge that is caulked to the base.

In another embodiment, the bearing holder may be provided with a lower end extending to the thrust washer cover and covering an end of the bearing.

In a further embodiment, the bearing holder may be provided with an inner circumferential surface coming into close contact with an outer circumferential surface of the thrust washer cover, and an edge that is caulked to the base.

In still another embodiment, the thrust washer cover may radially extend so as to cover the bearing.

In the spindle motor, the bearing holder may be provided with an inner circumferential surface that extends to the thrust washer cover and comes into close contact with an outer circumferential surface of the thrust washer, and an edge that is caulked to the base.

BRIEF DESCRIPTION OF THE DRAWINGS

The above and other objects, features and other advantages of the present invention will be more clearly understood from the following detailed description when taken in conjunction with the accompanying drawings, in which:

FIG. 8 is a sectional view schematically illustrating a conventional spindle motor;

FIG. 9 is an enlarged sectional view illustrating an important part of the conventional spindle motor of FIG. 8; and FIG. 10 is a sectional view schematically illustrating the state in which a thrust washer is pressure-fitted into the motor of FIG. 8 using an assembly jig.

DETAILED DESCRIPTION OF THE INVENTION

Figure 1:
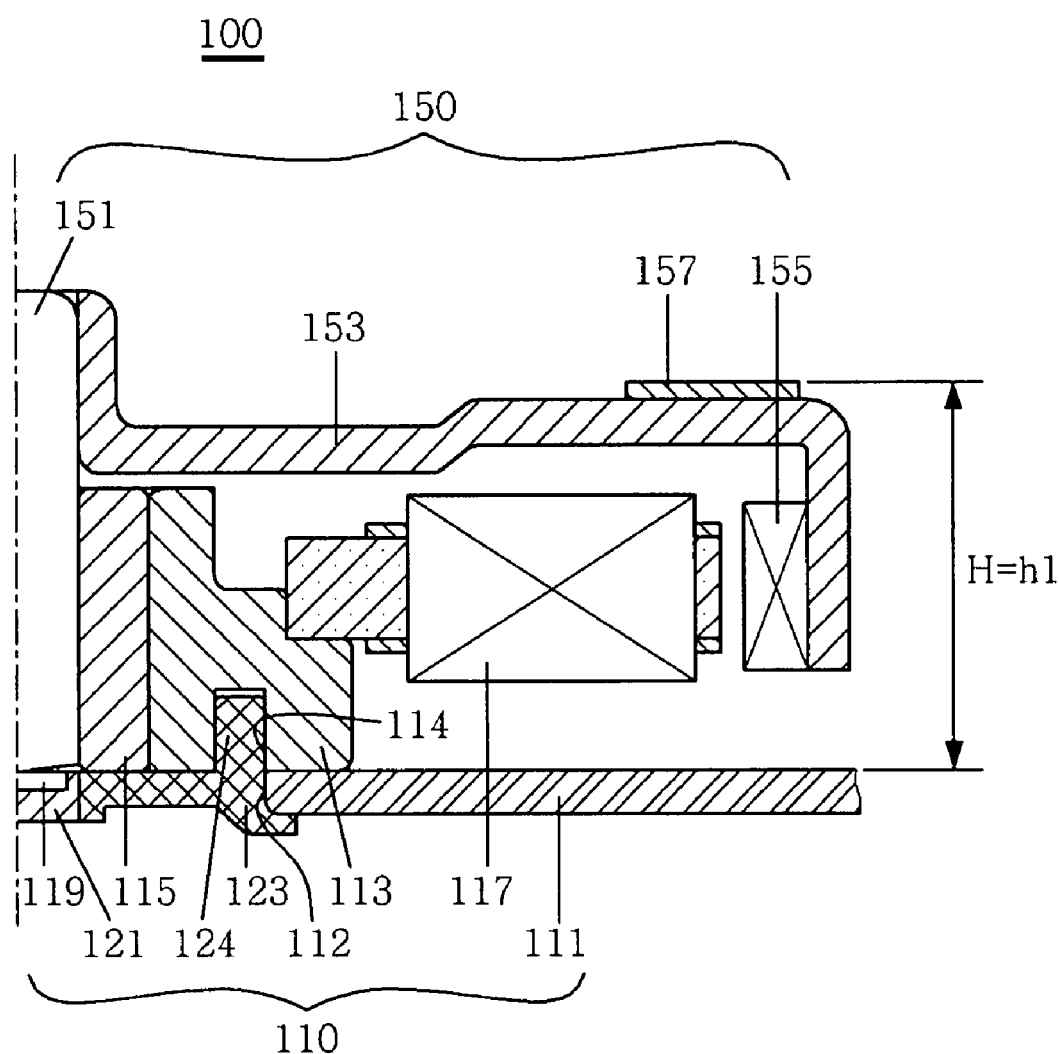
FIG. 1 is a sectional view schematically illustrating an ultra-slim spindle motor according to a first embodiment of the present invention.

Reference will now be made in greater detail to preferred embodiments of the invention, examples of which are illustrated in the accompanying drawings. Wherever possible, the same reference numerals will be used throughout the drawings and the description to refer to the same or like parts.

Figure 3:
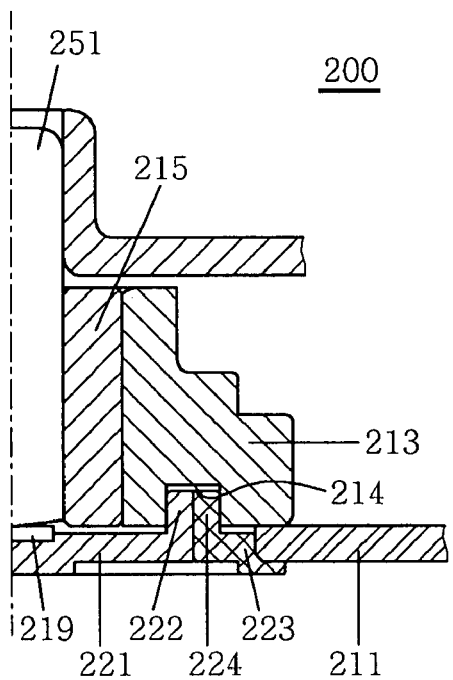
FIG. 3 is a sectional view schematically illustrating an ultra-slim spindle motor according to a second embodiment of the present invention.
Figure 4:
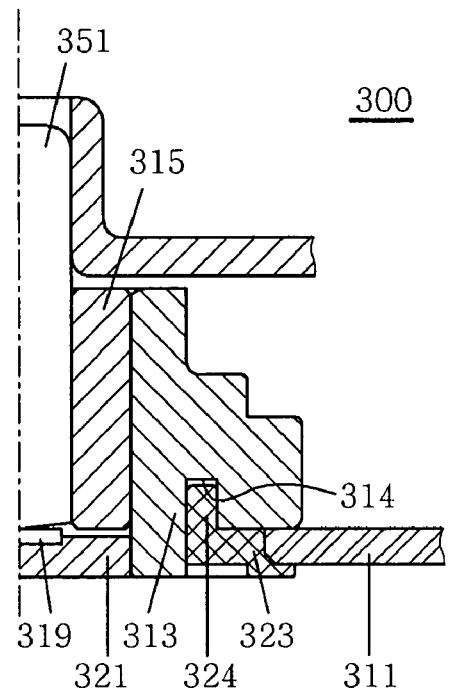
FIG. 4 is a sectional view schematically illustrating an ultra-slim spindle motor according to a third embodiment of the present invention.
Figure 5:
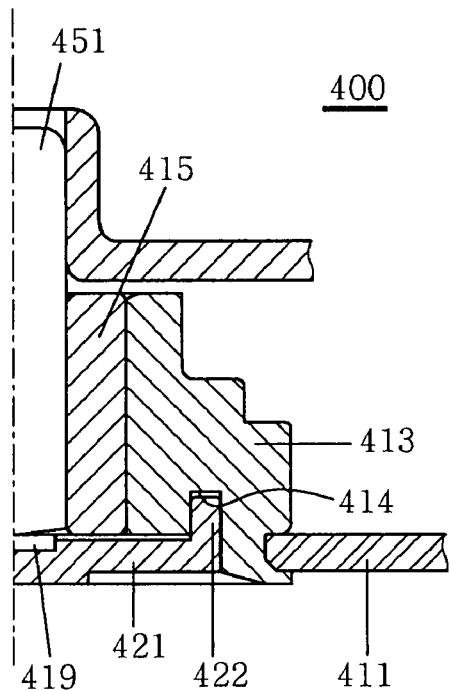
FIG. 5 is a sectional view schematically illustrating an ultra-slim spindle motor according to a fourth embodiment of the present invention.
Figure 6:
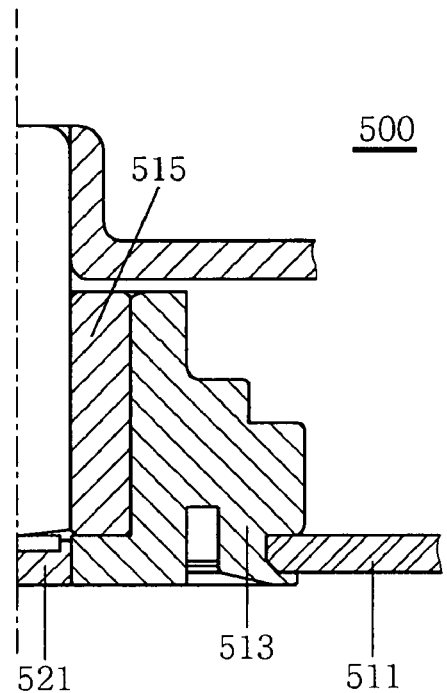
FIG. 6 is a sectional view schematically illustrating an ultra-slim spindle motor according to a fifth embodiment of the present invention.
Figure 7:
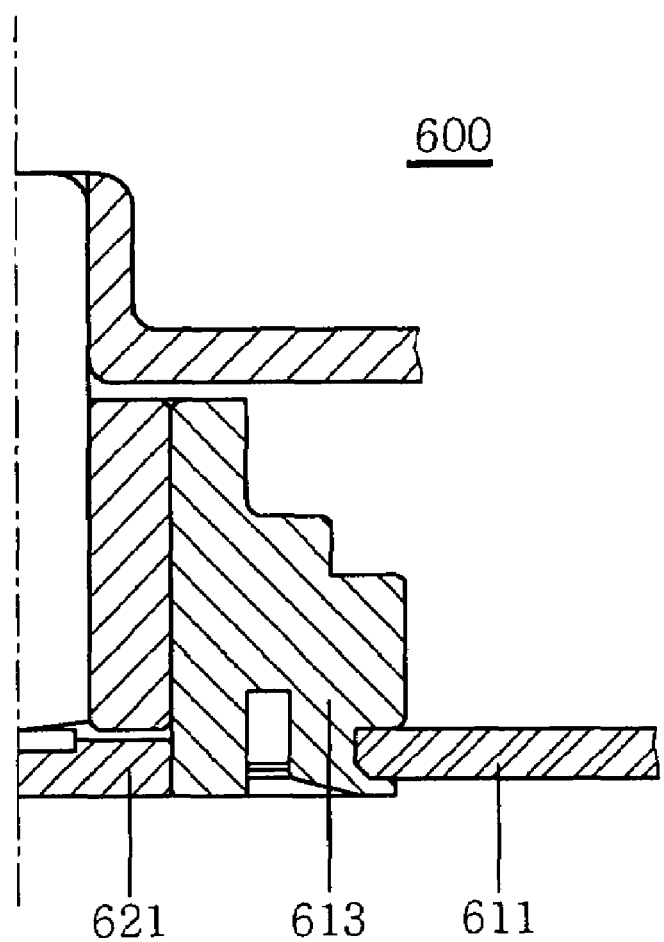
FIG. 7 is a sectional view schematically illustrating an ultra-slim spindle motor according to a sixth embodiment of the present invention.

In the spindle motors according to a first embodiment through a third embodiment of the present invention, which are illustrated in FIG. 1 through FIG. 4, a bearing is indirectly secured to a base using a bearing holder support, which constitutes a spindle motor and is caulked to the base, while, in spindle motors according to a fourth embodiment through a sixth embodiment of the present invention, which are illustrated in FIG. 5 through FIG. 7, a bearing holder is directly caulked to a base.

First Embodiment

As shown in FIG. 1, a spindle motor 100 according to the first embodiment of the present invention comprises a fixed assembly 110 and a rotary assembly 150, which is rotatably supported on the fixed assembly 110.

The fixed assembly 110 comprises a base 111, a bearing holder 113, a bearing 115, an armature 117, a thrust washer 119, a thrust washer cover 121 and a bearing holder support 123.

The base 111 firmly supports all of the elements of the fixed assembly 110, and is securely installed on a drive device (not shown), such as a hard disc drive (HDD), which uses the spindle motor 100 therein. The base 111 is typically formed of a nonmagnetic material, such as an aluminum alloy, with a central opening 112 formed through the center of the base 111.

The bearing holder 113 firmly supports the bearing 111 and has a hollow cylindrical shape, and is secured to the base 111 by caulking one end thereof.

The bearing 115 rotatably supports the rotary assembly 150. Described in detail, the bearing 115 rotatably supports a rotating shaft 151 and is configured as a cylindrical body made of metal. The central axis of the bearing 115 is aligned with the central axis of the rotating shaft 151. In the present invention, the lower end of the bearing 115 extends to a predetermined level, which is aligned with the lower end of the bearing holder 113, which is the lower end of the rotating shaft 151, so that, unlike a conventional spindle motor, the spindle motor 100 of the present invention can prevent the leakage of oil from a bearing unit without using a sealing cap.

The armature 117, which generates an electric field in the spindle motor 100 when external electric power is applied thereto, is securely mounted to the outer circumferential surface of the bearing holder 113.

The thrust washer 119, which supports the rotating shaft 151 in a thrusting direction, is securely placed in the spindle motor 100 such that the thrust washer 119 is brought into contact with the lower end of the rotating shaft 151 by a thrust washer cover 121, which is fitted into an opening defined by the inner circumferential surface of the bearing holder support 123. In the above state, unlike the related art, the upper surface of the thrust washer 119 is level with the upper surface of the base 111.

Figure 2:
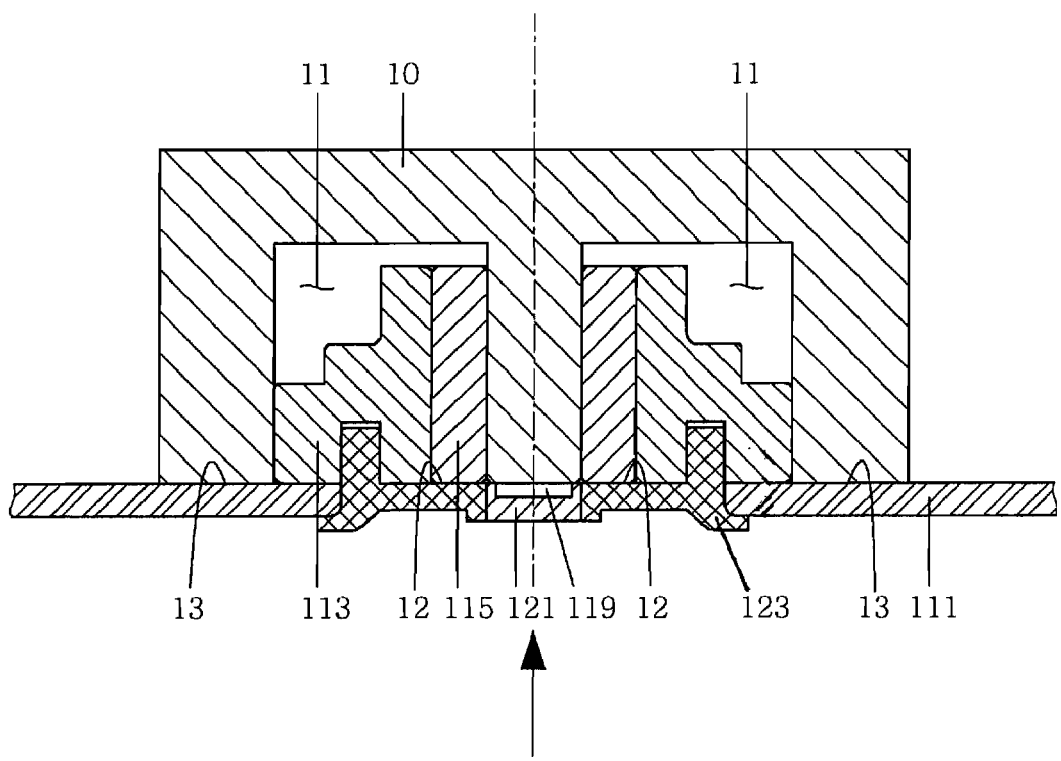
FIG. 2 is a sectional view schematically illustrating the state in which a thrust washer and/or a thrust washer cover is pressure-fitted into the motor of FIG. 1 using an assembly jig.

As shown in FIG. 2, in order to install the thrust washer 119 in the spindle motor 100, the thrust washer 119 is completely inserted into the thrust washer cover 121. Thereafter, the base 111 is seated on an assembly jig 10 such that both the bearing 115 and the bearing holder 113 are inserted into a depression 11 of the assembly jig 10. Thereafter, the thrust washer cover 121 is inserted into the opening of the bearing holder support 123 by forcing the thrust washer cover 121 in the direction shown by the arrow in FIG. 2.

The bearing holder support 123 is secured to the base 111 by fitting an annular protrusion 124 of the bearing holder support 123 into an annular depression 114 of the bearing holder 113 and by caulking the lower edge of the bearing holder support 123. In the above state, the upper surface of the bearing holder support 123 is brought into contact with the lower ends of both the bearing 115 and the bearing holder 113.

The rotary assembly 150 comprises a rotating shaft 151, a rotor cover 153, a magnet 155 and a rubber turntable 157.

The rotating shaft 151, which supports the rotary assembly 150 so that it can rotate relative to the fixed assembly 110, is installed in the spindle motor 100 such that the central axis of the rotating shaft 151 is aligned with the central axis of the bearing 115. The lower end of the rotating shaft 151 is supported by the thrust washer 119 in the thrusting direction. The outer circumferential surface of the rotating shaft 151 is rotatably supported by the bearing 115 in a non-contact method.

The rotor cover 153, on which a disc (not shown) is seated, is secured to the rotating shaft 151, with a clamp (not shown) provided on the center of the rotor cover 153 to clamp a disc on the rotor cover 153.

The magnet 155 is secured to the inner circumferential surface of the rotor cover 153 such that the magnet 155 faces the armature 117 and generates rotating force. When electric current is applied to the armature 117, the rotary assembly 150 is rotated by electromagnetic force, which is generated between the armature 117 and the magnet 155.

The rubber turntable 157, which stably supports a disc (not shown) thereon so as to prevent the disc from slipping over the turntable 157, is secured along the outer edge of the upper surface of the rotor cover 153.

In the above-mentioned construction, the height of the spindle motor 100 is determined by the height H from the upper surface of the base 111 to the upper surface of the rubber turntable 157. In the present invention, the height H is equal to the height h1 from the upper surface of the thrust washer 119 to the upper surface of the rubber turntable 157, that is, H=h1. Thus, the height H is determined only by the height h1, so that the tolerance of the height H is reflected only by the tolerance of the height h1. In other words, unlike the related art, the spindle motor of the present invention does not suffer from a large accumulated tolerance, which is the total sum of the production tolerance and the assembly tolerance of a plurality of elements.

Further, the upper surface of the thrust washer 119 and the upper surface of the base 111 are arranged in the same horizontal plane, so that, unlike the related art, the contact ends 12 and 13 of the assembly jig 10, which is used for pressure-fitting the thrust washer cover 121 with the thrust washer 119, have the same height, as shown in FIG. 2. In other words, the central contact end 12 and the outside contact end 13 of the assembly jig 10 have the same height, so that the contact ends 12 and 13 can be easily cut in one cutting operation, such as a planing or grinding operation. Thus, it is easy to produce the assembly jig 10.

Second Embodiment

As shown in FIG. 3, the general construction of the spindle motor 200 according to the second embodiment of the present invention remains the same as that described for the spindle motor 100 according to the first embodiment, except for a thrust washer cover 221 and a bearing holder support 223, and thus further explanation of the same elements is not deemed necessary.

In the second embodiment, a thrust washer 219 is inserted into the central area of a thrust washer cover 221, which radially extends to cover the lower ends of both a bearing holder 213 and a bearing 215. Further, the thrust washer cover 221 is provided with an annular flange 222, which is inserted into an annular depression 214 formed in the lower end of the bearing holder 213. In the above state, the thickness of the annular flange 222 is determined to be about half of the width of the annular depression 214. The inner circumferential surface of the annular flange 222 is in close contact with the inner circumferential surface of the annular depression 214. In the embodiment, the upper surface of the thrust washer 219 comes into contact with the lower end of a rotating shaft 251, and is aligned with the upper surface of the base 211 in the same horizontal plane.

The annular protrusion 224 of the bearing holder support 223 is pressure-fitted into the annular depression 214 of the bearing holder 213 and is caulked to the base 211 at the lower edge thereof. In the above state, the thickness of the annular protrusion 224 is determined to be about half of the width of the annular depression 214. Further, the outer circumferential surface of the annular protrusion 224 is in close contact with the outer circumferential surface of the annular depression 214. Therefore, both the annular flange 222 of the thrust washer cover 221 and the annular protrusion 224 of the bearing holder support 223 are closely inserted into the annular depression 214. Further, the side edge of the bearing holder support 223 is caulked to the base 211.

Third Embodiment

As shown in FIG. 4, the general construction of the spindle motor 300 according to the third embodiment of the present invention remains the same as that described for the spindle motor 100 according to the first embodiment, except for a bearing holder 313, a thrust washer cover 321 and a bearing holder support 315, and thus further explanation of the same elements is deemed unnecessary.

Unlike the first and second embodiments, the lower end of the bearing holder 313 extends to the lower end of the thrust washer cover 321. Thus, both the bearing 315 and the thrust washer cover 321 are completely covered by the inner circumferential surface of the bearing holder 313.

The thrust washer cover 321, in the central area of which the thrust washer 319 is seated, radially extends so as to come into contact with the lower end of the bearing 315. The thrust washer cover 321 is pressure-fitted into the bearing holder 313 and is secured to the inner circumferential surface of the bearing holder 313. In the above state, the thrust washer 319 comes into contact with the lower end of the rotating shaft 351, and the upper end of the thrust washer 319 is aligned with the upper end of the base 311 in the same horizontal plane.

The bearing holder support 323 has the same construction as that described for the bearing holder support 223 of the second embodiment, with an annular protrusion 324 of the bearing holder support 323 being pressured-fitted into the annular depression 314 of the bearing holder 313 and the lower end of the bearing holder support 323 being caulked to the base 311.

Fourth Embodiment

As shown in FIG. 5, the general construction of the spindle motor 400 according to the fourth embodiment of the present invention remains the same as that described for the spindle motor 100 according to the first embodiment, except for a bearing holder 413, a thrust washer cover 421 and the fact that, unlike the first through third embodiments, no bearing holder support is used in the fourth embodiment, and thus further explanation of the same elements is deemed unnecessary.

The bearing holder 413 and the bearing 415 have the same length, with an annular depression 414 formed in the lower surface of the bearing holder 413. The bearing holder 413 is inserted into the opening of the base 411 and is caulked to the base 411 at the outside edge thereof.

The thrust washer cover 421, in the central area of which the thrust washer 419 is seated, radially extends so as to cover both the lower end of the bearing 215 and part of the lower end of the bearing holder 413. Further, the thrust washer cover 421 is provided with an annular flange 422, which is inserted into the annular depression 414 formed in the lower surface of the bearing holder 413. In the above state, the thrust washer 419 is in contact with the lower end of the rotating shaft 451, while the upper end of the thrust washer 419 is aligned with the upper end of the base 411 in the same horizontal plane.

Fifth Embodiment

As shown in FIG. 6, the general construction of the spindle motor 500 according to the fifth embodiment of the present invention remains the same as that described for the spindle motor 100 according to the first embodiment, except for a bearing holder 513 and the fact that, unlike the first through third embodiments, no bearing holder support is used in the fifth embodiment, and thus further explanation of the same elements is deemed unnecessary.

The lower end of the bearing holder 513 extends to the level of the lower end of the thrust washer cover 521 and radially extends inwards so as to cover the lower end of the bearing 515. In the above state, the inside end surface of the lower end of the bearing holder 513, which radially extends inwards, comes into close contact with the outer circumferential surface of the thrust washer cover 521. Further, the bearing holder 513 is inserted into the opening of the base 511 and is secured to the base 511 by caulking the lower end of the bearing holder 513.

Sixth Embodiment

As shown in FIG. 7, the general construction of the spindle motor 600 according to the sixth embodiment of the present invention remains the same as that described for the spindle motor 100 according to the first embodiment, except for a bearing holder 613 and the fact that, unlike the first through third embodiments, no bearing holder support is used in the sixth embodiment, and thus further explanation of the same elements is deemed unnecessary.

The lower end of the bearing holder 613 extends to the level of the lower end of the thrust washer cover 621. The inner circumferential surface of the bearing holder 613 is in close contact with the outer circumferential surface of the thrust washer cover 621. Further, the bearing holder 613 is inserted into the opening of the base 611 and is secured to the base 611 by caulking the lower end of the bearing holder 613.

Although preferred embodiments of the present invention have been described for illustrative purposes, those skilled in the art will appreciate that various modifications, additions and substitutions are possible, without departing from the scope and spirit of the invention as disclosed in the accompanying claims.

As is apparent from the above descriptions, the spindle motor according to the present invention provides advantages in that, because the upper end of the thrust washer, which supports the rotating shaft in the thrusting direction, is aligned with the upper end of the base in the same horizontal plane, the height from the upper end of the base to the upper end of the rubber turntable becomes equal to the height from the upper end of the thrust washer to the upper end of the rubber turntable. Thus, the spindle motor according to the present invention has a greatly reduced accumulated tolerance, that is, the sum of the production tolerance and the assembly tolerance. Therefore, the height of the spindle motor, which is determined by the height from the upper end of the base to the upper end of the rubber turntable, can be greatly reduced, thereby easily realizing a thin spindle motor.

Further, in the spindle motor of the present invention, the upper end of the thrust washer and the upper end of the base are aligned with each other in the same horizontal plane, so that, unlike the related art, the contact ends of the assembly jig, which are used for pressure-fitting the thrust washer and/or the thrust washer cover, have the same height. Thus, the central contact end and the outside contact end of the assembly jig can be quickly cut through a single cutting operation, such as a planing or grinding operation. Therefore, it is very easy to produce the assembly jig.

What is claimed is:

1. A spindle motor, comprising:
   a bearing to rotatably support a rotating shaft;
   a bearing holder to securely hold the bearing therein;
   a base to securely support the bearing holder thereon;
   a thrust washer aligned at an upper end thereof with an upper end of the base in the same horizontal plane and supporting the rotating shaft in a thrusting direction;
   a thrust washer cover to receive the thrust washer therein so as to cover the thrust washer; and
   a bearing holder support securely installed between the thrust washer cover and the base and supporting the bearing holder,
   wherein the bearing and the bearing holder are placed such that ends thereof are arranged in the same horizontal plane, and the bearing holder support is secured to the bearing holder such that the bearing holder support covers both a lower end of the bearing and part of a lower end of the bearing holder.

2. The spindle motor as claimed in claim 1, wherein the bearing holder support includes a protrusion that is inserted into a depression formed in the lower end of the bearing holder.

3. The spindle motor as claimed in claim 1, wherein the bearing holder support includes an edge that is caulked to the base.

4. The spindle motor as claimed in claim 2, wherein the bearing holder support includes an edge that is caulked to the base.

5. A spindle motor, comprising:
   a bearing to rotatably support a rotating shaft;
   a bearing holder to securely hold the bearing therein;
   a base to securely support the bearing holder thereon;
   a thrust washer aligned at an upper end thereof with an upper end of the base in the same horizontal plane and supporting the rotating shaft in a thrusting direction;
   a thrust washer cover to receive the thrust washer therein so as to cover the thrust washer; and
   a bearing holder support securely installed between the thrust washer cover and the base and supporting the bearing holder,
   wherein ends of the bearing and the bearing holder are arranged in the same horizontal plane, and the thrust washer cover radially extends so as to cover both a lower end of the bearing and part of a lower end of the bearing holder, and is secured to the bearing holder,
   wherein the thrust washer cover includes an outside edge to be inserted into a depression formed in the lower end of the bearing holder, and
   wherein the bearing holder support includes a protrusion to be inserted into the depression of the bearing holder and an edge caulked to the base.

6. The spindle motor as claimed in claim 5, wherein the bearing holder includes an end extending to the thrust washer cover, an inner circumferential surface that comes into close contact with the thrust washer cover, and an outer circumferential surface that comes into close contact with the bearing holder support.

7. A spindle motor, comprising:
   a bearing to rotatably support a rotating shaft;
   a bearing holder to securely hold the bearing therein;
   a base to securely support the bearing holder thereon;
   a thrust washer aligned at an upper end thereof with an upper end of the base in the same horizontal plane and supporting the rotating shaft in a thrusting direction;
   a thrust washer cover to receive the thrust washer therein so as to cover the thrust washer; and
   a bearing holder support securely installed between the thrust washer cover and the base and supporting the bearing holder,
   wherein ends of the bearing and the bearing holder are arranged in the same horizontal plane, and the thrust washer cover radially extends so as to cover both a lower end of the bearing and part of a lower end of the bearing holder, and is secured to the bearing holder,
   wherein the thrust washer cover includes an outside edge to be inserted into a depression formed in the lower end of the bearing holder,
   wherein the bearing holder support includes a protrusion to be inserted into the depression of the bearing holder and an edge caulked to the base,
   wherein the bearing holder includes an end extending to the thrust washer cover, an inner circumferential surface that comes into close contact with the thrust washer cover, and an outer circumferential surface that comes into close contact with the bearing holder support, and
   wherein the bearing holder support includes a protrusion to be inserted into a depression formed in a lower end of the bearing holder and with an edge that is caulked to the base.

* * * * *